(12) United States Patent
Matsubara

(10) Patent No.: US 8,704,154 B2
(45) Date of Patent: Apr. 22, 2014

(54) NON-CONTACT PROBE WITH AN OPTICAL FILTER AND MEASURING MACHINE INCLUDING THE SAME

(75) Inventor: Hirotaka Matsubara, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 718 days.

(21) Appl. No.: 12/906,478

(22) Filed: Oct. 18, 2010

(65) Prior Publication Data

US 2011/0114828 A1 May 19, 2011

(30) Foreign Application Priority Data

Nov. 16, 2009 (JP) ................................ 2009-260612

(51) Int. Cl.
  *G02F 1/01* (2006.01)
  *G01J 3/50* (2006.01)
  *G01N 21/86* (2006.01)
(52) U.S. Cl.
  USPC ...................... 250/226; 250/216; 250/559.01
(58) Field of Classification Search
  USPC ...................... 250/221, 226, 559.01–559.49; 356/3–22, 614–624, 400, 402, 416, 356/419, 420
  See application file for complete search history.

(56) References Cited

U.S. PATENT DOCUMENTS

| 3,655,990 | A | 4/1972 | Nordqvist |
| 6,288,786 | B1 * | 9/2001 | Rudd et al. ..................... 356/623 |
| 2004/0075843 | A1 | 4/2004 | Marron et al. |
| 2005/0213082 | A1 * | 9/2005 | DiBernardo et al. .... 356/139.03 |

FOREIGN PATENT DOCUMENTS

| JP | A-59-092304 | 5/1984 |
| JP | A-60-64207 | 4/1985 |
| JP | U-63-142712 | 9/1988 |
| JP | A-63-238419 | 10/1988 |
| JP | A-63-302314 | 12/1988 |
| JP | U-1-144808 | 10/1989 |
| JP | A-3-65604 | 3/1991 |
| JP | U-3-27308 | 3/1991 |
| JP | A-04-166786 | 6/1992 |
| JP | U-4-69708 | 6/1992 |
| JP | A-5-248860 | 9/1993 |
| JP | A-6-137862 | 5/1994 |
| JP | A-7-027536 | 1/1995 |
| JP | B2-7-48044 | 5/1995 |
| JP | A-8-14887 | 1/1996 |
| JP | A-9-250903 | 9/1997 |
| JP | A-9-257467 | 10/1997 |

(Continued)

OTHER PUBLICATIONS

Search Report issued in corresponding European Application No. 10191149.3 dated Feb. 24, 2011.

(Continued)

*Primary Examiner* — Pascal M Bui Pho
(74) *Attorney, Agent, or Firm* — Oliff PLC

(57) ABSTRACT

A measuring machine includes a non-contact probe that detects a step gauge without contact. The non-contact probe includes an emitting element that radiates light, a light receiving element that receives the light radiated from the emitting element, and an optical filter that covers an optical path to the light receiving element. The optical filter includes a transmission band in which the light radiated from the emitting element is transmitted and a blocking band in which light to which the light receiving element is sensitive is blocked.

5 Claims, 6 Drawing Sheets

(56) References Cited

FOREIGN PATENT DOCUMENTS

| JP | A-10-174114 | 6/1998 |
|----|----|----|
| JP | A-11-023217 | 1/1999 |
| JP | A-11-201729 | 7/1999 |
| JP | A-2000-230812 | 8/2000 |
| JP | A-2002-031506 | 1/2002 |
| JP | A-2003-194526 | 7/2003 |
| JP | A-2004-361224 | 12/2004 |
| JP | A-2007-114125 | 5/2007 |
| JP | A-2008-166499 | 7/2008 |
| JP | A-2009-092479 | 4/2009 |
| JP | A-2009-186196 | 8/2009 |

OTHER PUBLICATIONS

Aug. 13, 2013 Office Action issued in Japanese Application No. 2009-260612 (with English translation).

Dec. 2, 2013 Office Action issued in Chinese Patent Application No. 201010547849.2 (with translation).

* cited by examiner

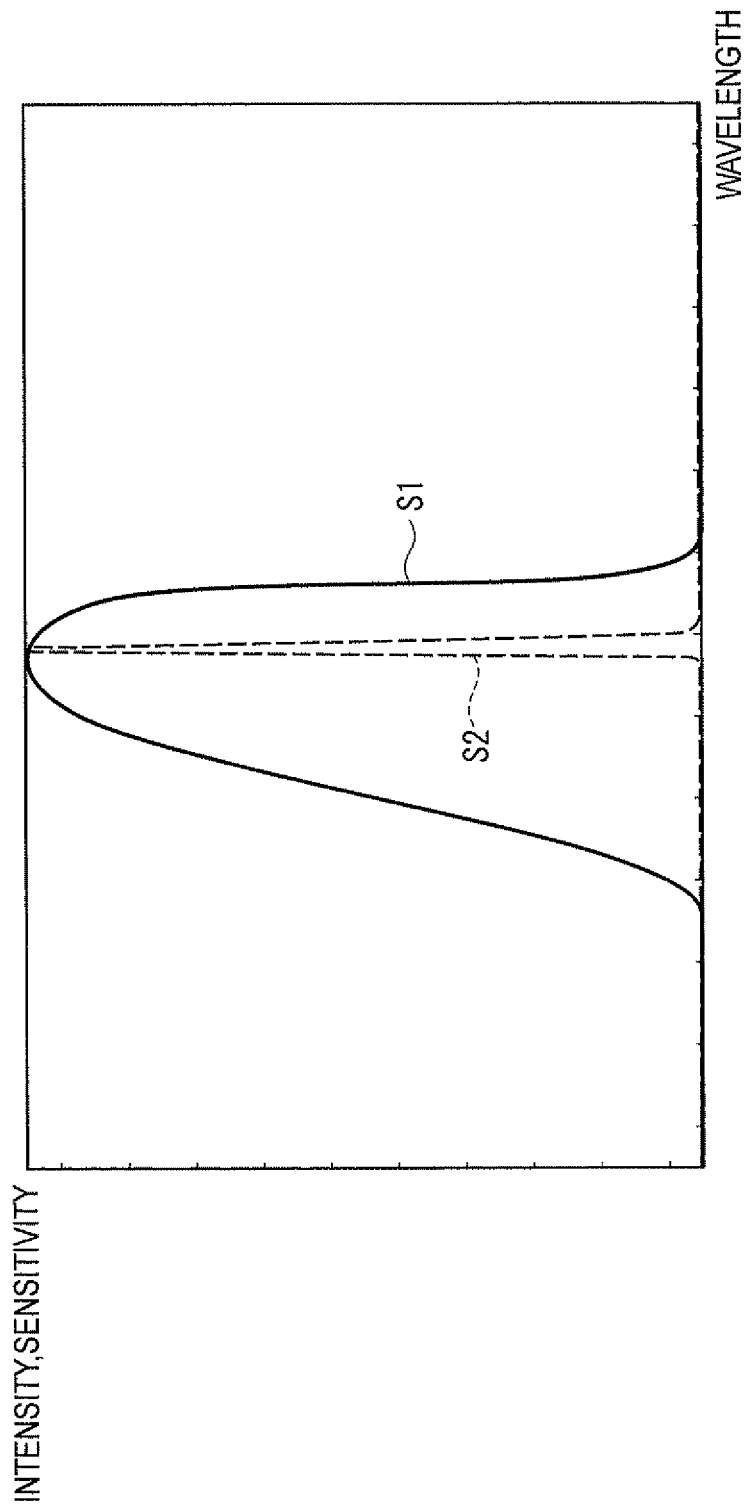

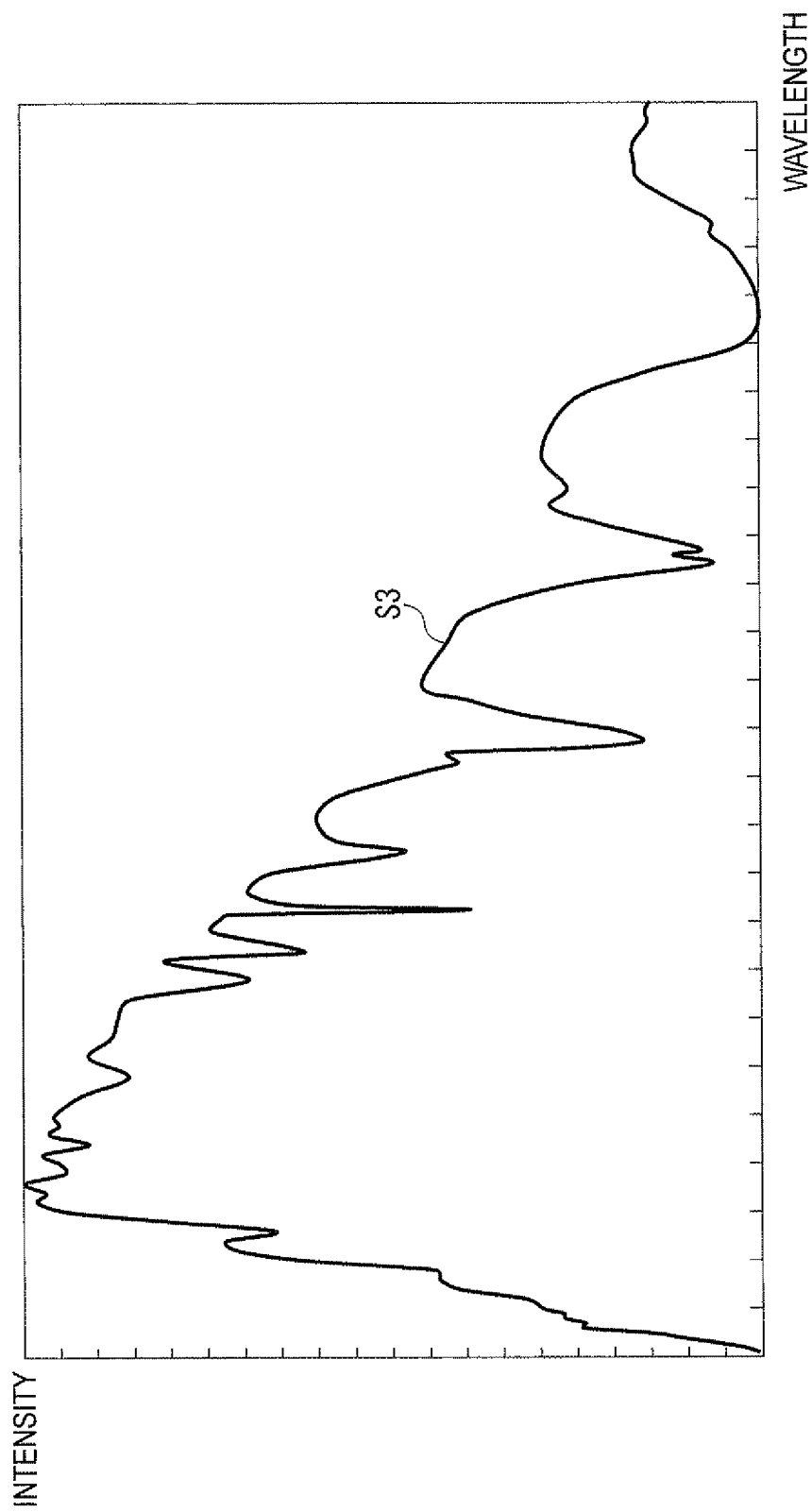

NON-CONTACT PROBE WITH AN OPTICAL FILTER AND MEASURING MACHINE INCLUDING THE SAME

The entire disclosure of Japanese Patent Application No. 2009-260612 filed Nov. 16, 2009 is expressly incorporated by reference herein.

BACKGROUND OF THE INVENTION

1. Field of the Invention

The present invention relates to a non-contact probe and a measuring machine provided with the non-contact probe.

2. Description of Related Art

There have been typically known a non-contact probe including an emitting element that radiates light and a light receiving element that receives the light radiated from the emitting element, the non-contact probe detecting an object without contact based on the light received by the light receiving element, and a measuring machine provided with the non-contact probe (see, for instance, Patent Literature 1: JP-B-7-48044).

A measuring instrument (measuring machine) for a step gauge disclosed in Patent Literature 1 includes a detector (non-contact probe). The detector includes an emitting portion (emitting element) and a light receiving portion (light receiving element). Light radiated from the emitting portion is reflected on the step gauge (object) to be measured and the reflected light is received by the light receiving portion. The detector detects a position of the step gauge to be measured based on the light received by the light receiving portion.

FIG. 5 is an illustration showing an example of spectral characteristics of the emitting element and the light receiving element. In FIG. 5, a horizontal axis represents wavelength and a vertical axis represents intensity and sensitivity.

In such a non-contact probe, as shown in FIG. 5, a spectral linewidth of a spectral-sensitivity characteristic S1 (represented by a solid line in FIG. 5) of the light receiving element is designed to be sufficiently broad as compared to a spectral linewidth of a spectral-intensity characteristic S2 (represented by a dotted line in FIG. 5) of the emitting element so that the light receiving element can receive the light radiated from the emitting element.

FIG. 6 is an illustration showing spectral characteristics of sun light. In FIG. 6, a horizontal axis represents wavelength and a vertical axis represents intensity.

Here, as shown in FIG. 6, a spectral-intensity characteristic S3 of sun light is distributed in a broad range.

Accordingly, in the measuring instrument for the step gauge disclosed in Patent Literature 1, since the light receiving portion is exposed outside, sun light and the like enter the light receiving portion to cause disturbance, so that the position of the step gauge to be measured may be erroneously detected.

In order to avoid such an erroneous detection, it is considered to increase intensity of the light radiated from the emitting element to improve an SN (Signal to Noise) ratio to the disturbance.

Alternatively, in order to avoid such an erroneous detection, it is also considered to strengthen a directional characteristic of the light receiving element to improve an SN (Signal to Noise) ratio to the disturbance.

However, in order to increase the intensity of the light radiated from the emitting element and the directional characteristic of the light receiving element, designs of the non-contact probe, a structure of the measuring machine, an electrical system and the like need to be changed. Moreover, with increasing intensity of the light radiated from the emitting element, lifetime of the emitting element is shortened.

SUMMARY OF THE INVENTION

An object of the invention is to provide a non-contact probe that can avoid disturbance caused by sun light and the like without design change, and a measuring machine.

According to an aspect of the invention, a non-contact probe includes: an emitting element that radiates light; and a light receiving element that receives the light radiated from the emitting element, the non-contact probe detecting an object without contact based on the light received by the light receiving element; and an optical filter that covers an optical path to the light receiving element, the optical filter including a transmission band in which the light radiated from the emitting element is transmitted and a blocking band in which light to which the light receiving element is sensitive is blocked.

With this arrangement, since the non-contact probe includes the optical filter that covers the optical path to the light receiving element, the light receiving element can only receive the light transmitted through the optical filter. Further, since the optical filter includes the transmission band in which the light radiated from the emitting element is transmitted and the blocking band in which light to which the light receiving element is sensitive is blocked, sun light and the like can be prevented from entering the light receiving element. Accordingly, the non-contact probe can avoid disturbance caused by sun light and the like without design change.

In the aspect of the invention, preferably, the optical filter includes a light-incident surface and a light radiation surface parallel to each other in which the light-incident surface and the light radiation surface are disposed to be orthogonal to an optical axis of the light receiving element.

Here, the light radiated from the emitting element enters the light receiving element through the light-incident surface and the light radiation surface of the optical filter.

According to the above aspect of the invention, when the optical filter is disposed in the non-contact probe that is designed in a manner such that the light radiated from the emitting element enters the light receiving element along the optical axis of the light receiving element, the light-incident surface and the light radiation surface of the optical filter are orthogonal to the optical axis of the light receiving element, so that the light entering the optical filter goes straight irrespective of the refractive index of the optical filter. Accordingly, since the light radiated from the emitting element can enter the light receiving element along the optical axis of the light receiving element, the non-contact probe can avoid disturbance caused by sun light and the like without design change.

In another aspect of the invention, preferably, the optical filter includes a light-incident surface and a light radiation surface parallel to each other, the light-incident surface and the light radiation surface being disposed to be inclined to an optical axis of the light receiving element, and a distance t between the light-incident surface and the light radiation surface of the optical filter is designed to satisfy a relation of two formulae below when an angle between the optical axis of the light receiving element and a normal line of the light-incident surface is denoted by i, a refractive index of the optical filter is denoted by n, and a distance from the optical axis of the light receiving element to the farthest point in which the light receiving element receives light is denoted by d.

$$t < d \cdot \cos(r)/\sin(i-r)$$

$$r = a\sin(\sin(i)/n)$$

According to the above aspect of the invention, when the optical filter is disposed in the non-contact probe that is designed in a manner such that the light radiated from the emitting element enters the light receiving element along the optical axis of the light receiving element, the light-incident surface and the light radiation surface of the optical filter are inclined to the optical axis of the light receiving element, so that the light entering the optical filter is refracted in accordance with the angle between the optical axis of the light receiving element and the normal line of the light-incident surface, i.e., the light-incident angle to the incident surface of the light radiated from the emitting element, and the refractive index of the optical filter.

According to the above aspect of the invention, the distance t between the light-incident surface and the light radiation surface of the optical filter is designed to satisfy the relation between the above-mentioned two formulae. Accordingly, since the light radiated from the emitting element can enter a range in which the light receiving element can receive light, the non-contact probe can avoid disturbance caused by sun light and the like without design change.

A measuring machine according to still another aspect of the invention includes the above-mentioned non-contact probe for measuring an object to be detected by the non-contact probe.

With this arrangement, since the measuring machine includes the above-mentioned non-contact probe, the measuring machine can provide the same advantages as the above-mentioned non-contact probe.

BRIEF DESCRIPTION OF THE DRAWINGS

FIG. 5 is an illustration showing an example of spectral characteristics of an emitting element and a light receiving element.

FIG. 6 is an illustration showing spectral characteristics of sun light.

DETAILED DESCRIPTION OF PREFERRED EMBODIMENT(S)

First Exemplary Embodiment

A first exemplary embodiment of the invention will be described below with reference to the attached drawings.

Figure 1:
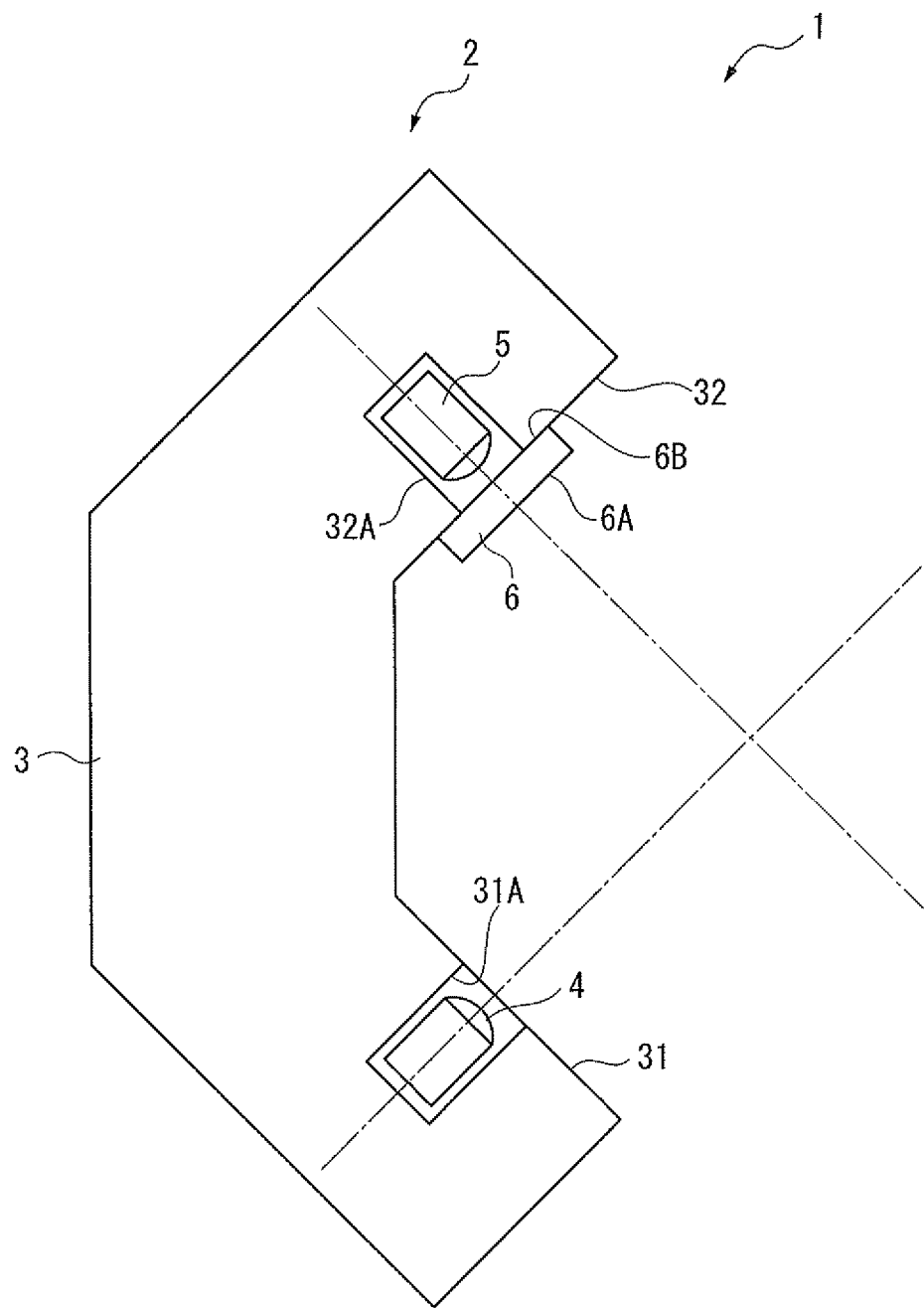
FIG. 1 schematically shows a cross section of a non-contact probe of a measuring machine according to a first exemplary embodiment of the invention.

FIG. 1 schematically shows a cross section of a non-contact probe 2 of a measuring machine 1 according to the first exemplary embodiment of the invention.

As shown in FIG. 1, the measuring machine 1 is provided with the non-contact probe 2 that detects a step gauge (not shown) as an object without contact. The measuring machine 1 measures a position of an end face of the step gauge detected by the non-contact probe 2. The measuring machine 1 is configured in the same manner as the measuring instrument for the step gauge disclosed in Patent Literature 1 except for a structure of the non-contact probe 2.

The non-contact probe 2 includes a probe body 3, an emitting element 4 attached to a first end (a middle-lower side of FIG. 1) of the probe body 3, a light receiving element 5 attached to a second end (a middle-upper side of FIG. 1) of the probe body 3, and an optical filter 6.

The probe body 3 is formed in a shape such that both longitudinal ends of a rectangular parallelepiped are bent toward the object. On inner surfaces 31 and 32 at the both ends of the probe body 3, holes 31A and 32A for disposing the emitting element 4 and the light receiving element 5 are respectively formed toward outer surfaces.

The emitting element 4 radiates light and is disposed in a manner such that an optical axis (represented by a dashed-dotted line in FIG. 1) is orthogonal to the inner surface 31.

The light receiving element 5 receives the light radiated from the emitting element 4 and is disposed in a manner such that an optical axis (a dashed-dotted line in FIG. 1) is orthogonal to the inner surface 32.

The emitting element 4 and the light receiving element 5 are disposed in a manner such that the optical axes thereof are mutually intersected.

FIG. 1 schematically shows a cross section of the non-contact probe 2 taken in a plane including the optical axes of the emitting element 4 and the light receiving element 5.

The optical filter 6 is formed in a rectangular plate and is attached to the inner surface 32 of the probe body 3 so as to close the hole 32A.

When the end face of the step gauge is located at an intersection of the optical axes of the emitting element 4 and the light receiving element 5, the light radiated from the emitting element 4 is reflected on the end face of the step gauge and enters the light receiving element 5 through the optical filter 6. The non-contact probe 2 detects the end face of the step gauge based on the light received by the light receiving element 5 without contact.

In other words, the optical filter 6 is attached to the inner surface 32 of the probe body 3 so as to cover an optical path to the light receiving element 5. The optical filter 6 includes a light-incident surface 6A and a light radiation surface 6B parallel to each other. The light-incident surface 6A and the light radiation surface 6B are disposed to be orthogonal to the optical axis of the light receiving element 5.

Figure 2:
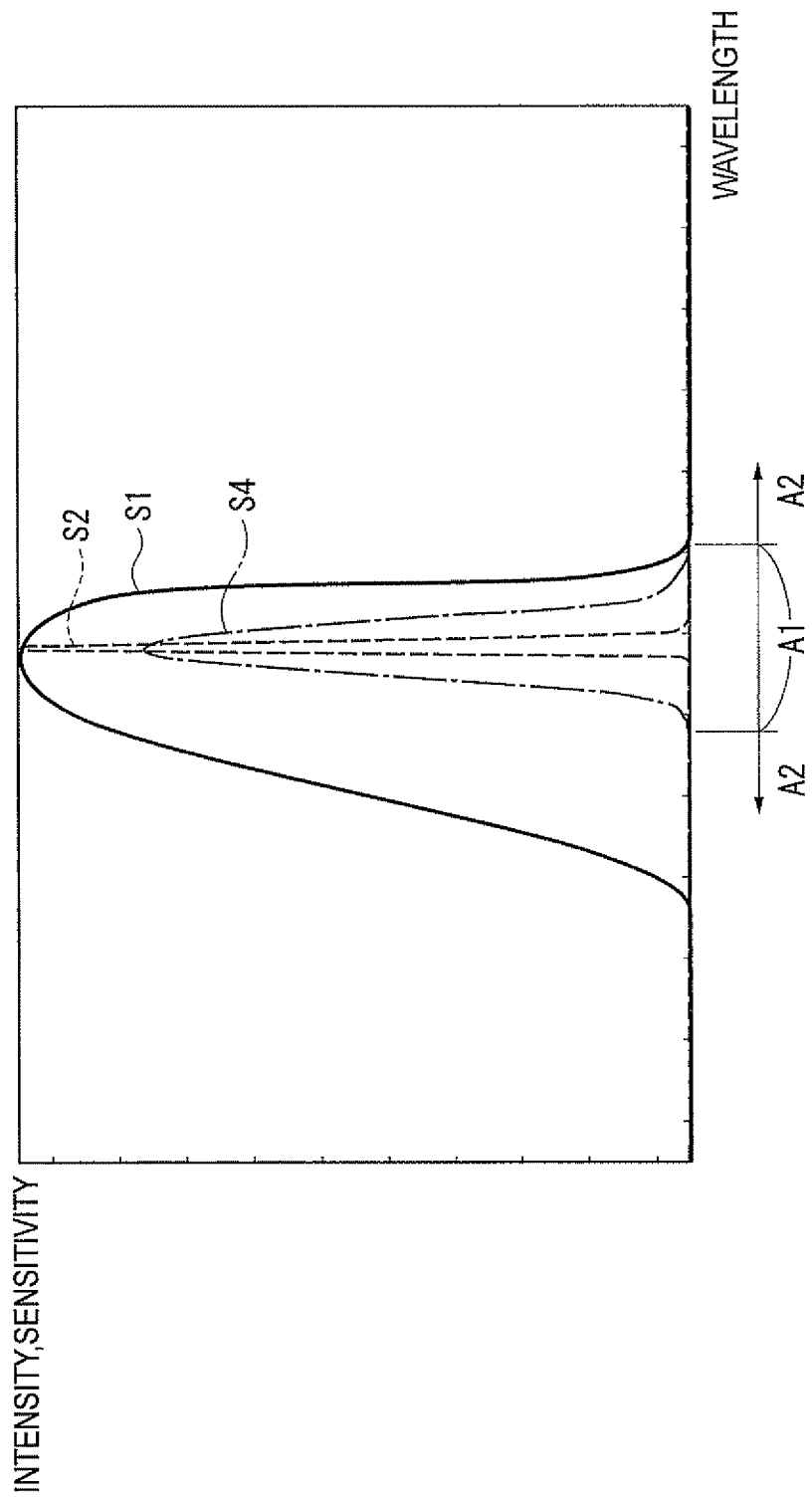
FIG. 2 is an illustration showing spectral characteristics of an emitting element, a light receiving element and an optical filter in the first exemplary embodiment.

FIG. 2 is an illustration showing spectral characteristics of the emitting element 4, the light receiving element 5 and the optical filter 6. In FIG. 2, a horizontal axis represents wavelength and a vertical axis represents intensity and sensitivity.

As shown in FIG. 2, a spectral linewidth of a spectral-sensitivity characteristic S1 (represented by a solid line in FIG. 2) of the light receiving element 5 is designed to be sufficiently broad as compared to a spectral linewidth of a spectral-intensity characteristic S2 (represented by a dotted line in FIG. 2) of the emitting element 4 so that the light receiving element 5 can receive the light radiated from the emitting element 4.

A spectral characteristic S4 (represented by a dashed-dotted line in FIG. 2) of the optical filter 6 includes a transmission band A1 in which the light radiated from the emitting element 4 is transmitted and a blocking band A2 in which light to which the light receiving element 5 is sensitive is blocked.

In this exemplary embodiment, the optical filter 6 is provided by coating a glass substrate (a base material) with silicon oxide and titanium oxide in layers. Both surfaces of the substrate or either surface thereof can be coated. An applicable material for coating is a dielectric material such as aluminum oxide, tantalum oxide and niobium oxide as well as the above-mentioned silicon oxide and titanium oxide. An applicable base material is quartz, crystalline material such as fluorite, plastics and transparent ceramics as well as the above-mentioned glass.

According to this exemplary embodiment, the following advantages can be obtained.

(1) Since the measuring machine 1 includes the non-contact probe 2 in which the optical filter 6 covers the optical path to the light receiving element 5, the light receiving element 5 can only receive the light transmitted through the optical filter 6. Further, since the optical filter 6 includes the transmission band A1 in which the light radiated from the emitting element 4 is transmitted and the blocking band A2 in which light to which the light receiving element 5 is sensitive is blocked, sun light and the like can be prevented from entering the light receiving element 5. Accordingly, the non-contact probe 2 can avoid disturbance caused by sun light and the like without design change.

(2) Since the light-incident surface 6A and the light radiation surface 6B of the optical filter 6 are orthogonal to the optical axis of the light receiving element 5, the light entering the optical filter 6 goes straight irrespective of the refractive index of the optical filter 6. Accordingly, since the light radiated from the emitting element 4 can enter the light receiving element 5 along the optical axis of the light receiving element 5, the non-contact probe 2 can avoid disturbance caused by sun light and the like without design change.

Second Exemplary Embodiment

A second exemplary embodiment of the invention will be described below with reference to the attached drawings. In the following description, already-described components will be provided with the same reference signs and an explanation of the components will be omitted.

Figure 3:
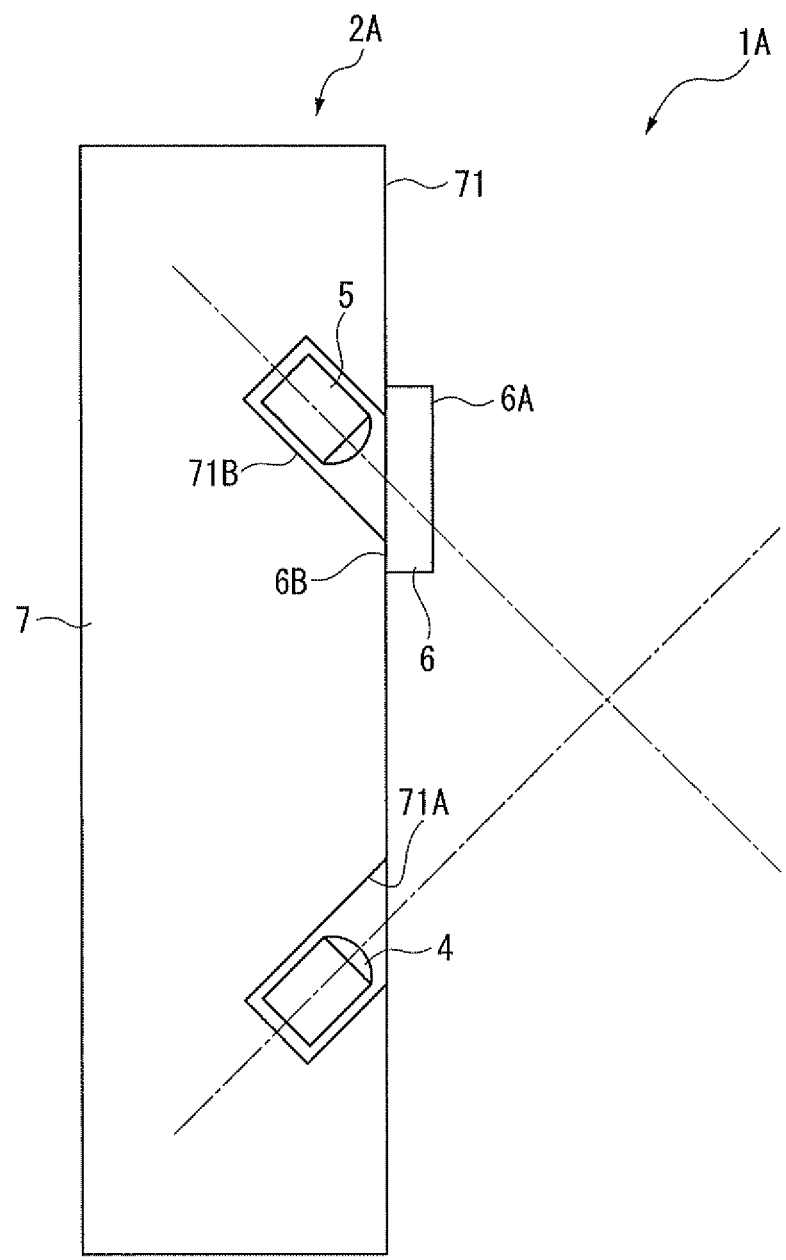
FIG. 3 schematically shows a cross section of a non-contact probe of a measuring machine according to a second exemplary embodiment of the invention.

FIG. 3 schematically shows a cross section of a non-contact probe 2A of a measuring machine 1A according to the second exemplary embodiment of the invention.

In the first exemplary embodiment, the optical filter 6 is disposed in a manner such that the light-incident surface 6A and the light radiation surface 6B are orthogonal to the optical axis of the light receiving element 5. However, the second exemplary embodiment is different from the first exemplary embodiment in that the optical filter 6 is disposed in a manner such that the light-incident surface 6A and the light radiation surface 6B are inclined to the optical axis of the light receiving element 5, as shown in FIG. 3.

The measuring machine 1A includes the non-contact probe 2A. The non-contact probe 2A includes a probe body 7, the emitting element 4 attached to a first end (a middle-lower side of FIG. 3) of the probe body 7, the light receiving element 5 attached to a second end (a middle-upper side of FIG. 3) of the probe body 7, and the optical filter 6.

The probe body 7 is formed in a rectangular parallelepiped. On an inner surface 71 of the probe body 7, holes 71A and 71B for disposing the emitting element 4 and the light receiving element 5 are respectively formed toward an outer surface to be inclined to the inner surface 71.

The emitting element 4 and the light receiving element 5 are disposed in a manner such that the optical axes thereof (represented by dashed-dotted lines in FIG. 3) are inclined to the inner surface 71 and intersected with each other.

FIG. 3 schematically shows a cross section of the non-contact probe 2A taken in a plane including the optical axes of the emitting element 4 and the light receiving element 5.

The optical filter 6 is formed in a rectangular plate and is attached to the inner surface 71 of the probe body 7 so as to close the hole 71B.

In other words, the optical filter 6 is attached to the inner surface 71 of the probe body 7 so as to cover the optical path to the light receiving element 5. The optical filter 6 includes the light-incident surface 6A and the light radiation surface 6B parallel to each other. The light-incident surface 6A and the light radiation surface 6B are disposed to be inclined to the optical axis of the light receiving element 5.

Figure 4:
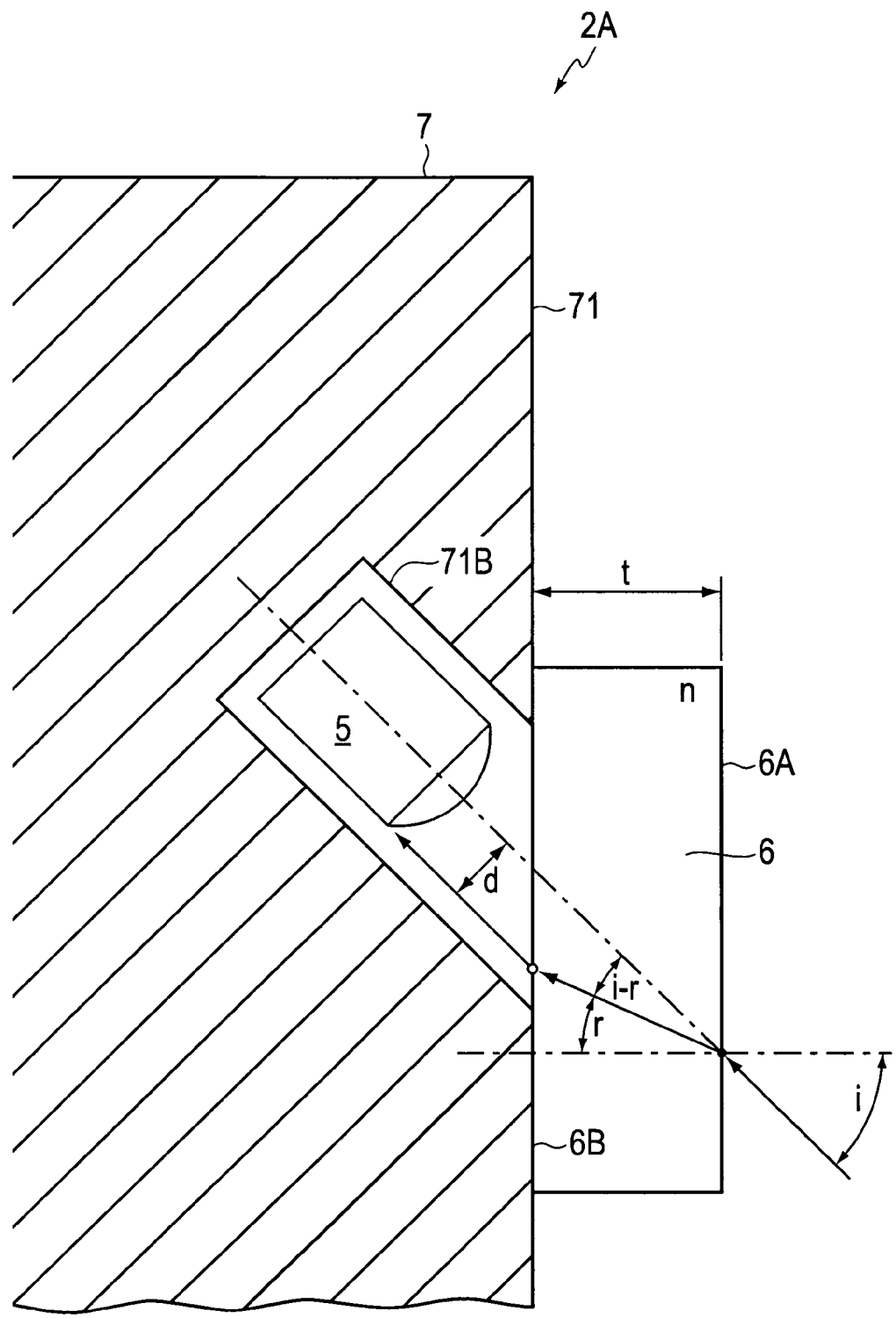
FIG. 4 illustrates an enlarged vicinity of a light receiving element in the second exemplary embodiment.

FIG. 4 illustrates an enlarged vicinity of the light receiving element 5.

The distance t between the light-incident surface 6A and the light radiation surface 6B of the optical filter 6 is designed to satisfy a relation of the following two formulae according to Snell's law when an angle between the optical axis of the light receiving element 5 and a normal line of the light-incident surface 6A, i.e., a light-incident angle to the light-incident surface 6A, is denoted by i, a refractive index of the optical filter 6 is denoted by n, and a distance from the optical axis of the light receiving element 5 to the farthest point in which the light receiving element 5 can receive light is denoted by d. In this exemplary embodiment, the range in which the light receiving element 5 can receive light is a radius of the cylindrical light receiving element 5. In the following two formulae, r represents a light refracting angle to the light-incident surface 6A.

$t < d \cdot \cos(r)/\sin(i-r)$ $r = a\sin(\sin(i)/n)$

In the second exemplary embodiment, the refractive index n of the optical filter 6 represents an entire refractive index of the optical filter 6, i.e., refractive indexes of the glass substrate and the coating thereon. When the optical filter is formed by attaching a plastic film on the glass substrate as the base material, since the plastic film has a much thinner thickness than the glass substrate, a refractive index of the plastic film can be ignored. Accordingly, the refractive index of the optical filter can be defined as the refractive index of the glass substrate.

In the second exemplary embodiment, in addition to the above advantage (1) of the first exemplary embodiment, the following advantages can also be obtained. (3) The distance t between the light-incident surface 6A and the light radiation surface 6B of the optical filter 6 is designed to satisfy the relation between the above-mentioned two formulae. Accordingly, since the light radiated from the emitting element 4 can enter a range in which the light receiving element 5 can receive light, the non-contact probe 2A can avoid disturbance caused by sun light and the like without design change.

MODIFICATION OF EXEMPLARY EMBODIMENT(S)

The invention is not limited to the forgoing exemplary embodiments, but includes modifications, improvements and the like within the range in which an object of the invention can be achieved.

In the above exemplary embodiments, for instance, the non-contact probes 2 and 2A include a pair of the emitting element 4 and the light receiving element 5, but may include a plurality of pairs of the emitting elements and the light receiving elements.

In the above exemplary embodiments, the light-incident surface 6A and the light radiation surface 6B of the optical filter 6 are parallel to each other, but the light-incident surface and the light radiation surface of the optical filter may not be parallel to each other.

In the above exemplary embodiments, the non-contact probes 2 and 2A are used in the measuring machines 1 and 1A for measuring the position of the end face of the step gauge to be detected, but may be used in any type of measuring machines, or in industrial machinery such as a machine tool.

What is claimed is:

1. A non-contact probe comprising:
an emitting element that radiates light;
a light receiving element that receives the light radiated from the emitting element, the non-contact probe detecting an object without contact based on the light received by the light receiving element; and
an optical filter that covers an optical path to the light receiving element, the optical filter comprising a transmission band in which a light included in a first wavelength range of the light radiated from the emitting element is transmitted and a blocking band in which light included in a second wavelength range outside of the first wavelength range is blocked,
wherein the optical filter has a spectral linewidth of a spectral characteristic that is set to be broader than a spectra linewidth of a spectral characteristic of the emitting element and narrower than a spectral linewidth of a spectral characteristic of the light receiving element,
wherein the optical filter comprises a light-incident surface and a light radiation surface parallel to each other, the light-incident surface and the light radiation surface being disposed to be inclined to a plane orthogonal to an optical axis of the light receiving element, and a distance t between the light-incident surface and the light radiation surface of the optical filter is designed to satisfy a relation of formulae below when an angle between the optical axis of the light receiving element and a normal line of the light-incident surface is denoted by I, a refractive index of the optical filter is denoted by n, and a distance from the optical axis of the light receiving element to the farthest point in which the light receiving element receives light is denoted by d:

$t < d \cdot \cos(r)/\sin(1-r)$;

$r = a\sin(\sin(i)/n)$.

2. The non-contact probe according to claim 1, wherein the optical filter comprises a light-incident surface and a light radiation surface parallel to each other, the light-incident surface and the light radiation surface being disposed to be orthogonal to an optical axis of the light receiving element.

3. A measuring machine, comprising the non-contact probe according to claim 1, for measuring an object to be detected by the non-contact probe.

4. A measuring machine, comprising the non-contact probe according to claim 2, for measuring an object to be detected by the non-contact probe.

5. The non-contact probe according to claim 1, further including a probe body with a cavity, the cavity housing the light receiving element, the cavity having an opening facing the optical path to the light receiving element, and wherein the optical filter is sized and arranged to entirely cover the opening of the cavity.

* * * * *